A. P. WEBBER.
Plow Fender.

No. 122,087.          Patented Dec. 19, 1871.

(On scale of ⅝ inc. to an inch.)

Witnesses
Henry W. Wells.
John E. Jones.

Inventor:
Alanson P. Webber.
by Edmund Thurlow
his Atty in Fact.

UNITED STATES PATENT OFFICE.

ALANSON P. WEBBER, OF SARATOGA TOWNSHIP, ILLINOIS.

IMPROVEMENT IN PLOW-FENDERS.

Specification forming part of Letters Patent No. 122,087, dated December 19, 1871.

*To all whom it may concern:*

Be it known that I, ALANSON P. WEBBER, of Saratoga township, in the county of Marshall and in the State of Illinois, have invented a Plow-Fender; and do hereby declare that the following is a full, clear, and exact description thereof, reference being had to the annexed drawing making a part of this specification, in which like letters of reference refer to like parts, and in which—

Figure 1:
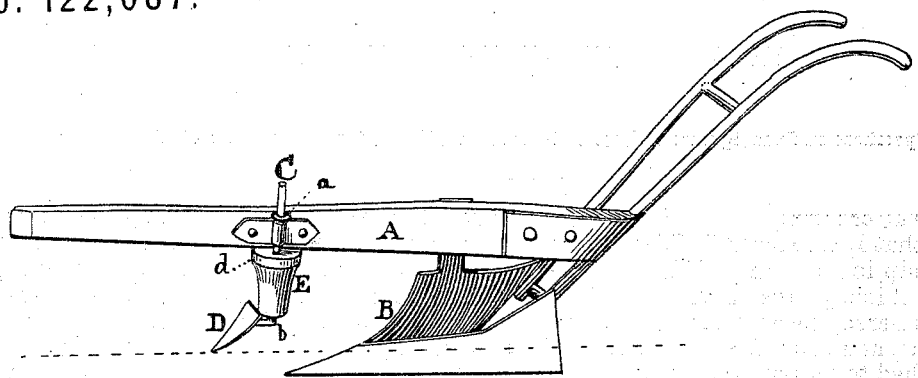
Figure 2:
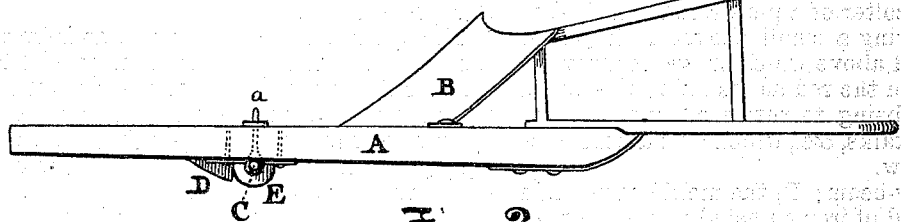
Figure 3:
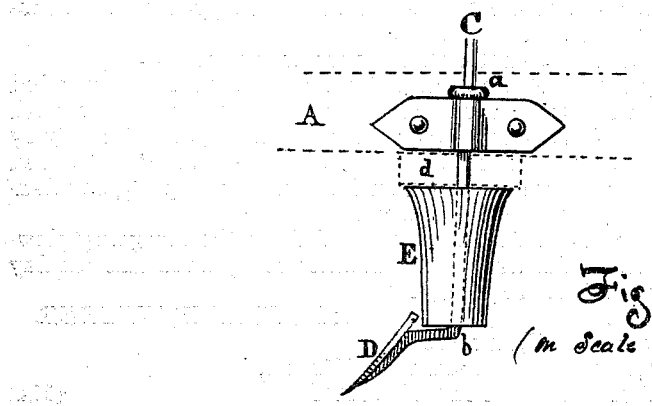

Figure 1 represents a perspective view of a plow and fender; Fig. 2, plan of the same; Fig. 3, side elevation of the fender on a larger scale.

This invention consists in placing before the mold-board or colter of a plow a rod attached to the beam, carrying a small shovel at its lower end, behind and above which shovel is a revolving roller, set on the rod as its axle; the object of the device being to throw off encumbering weeds, vines, stalks, &c., which would otherwise hamper the plow.

A is the plow-beam; B, the mold-board; C, a round bar or rod of iron adjusted to the beam A, on the land-side side, by staple-bolts *a* or equivalent adjustable fastenings, for raising or lowering the rod. The latter inclines forward and downward from said beam in front of the mold-board or colter, terminating in an elbow, *b*, or shoulder; thence projecting again downward far enough to receive the small shovel D, which is riveted to the front of the rod, the point of the shovel being a little below the level of the soil in front of the plow when at work; E, a roller or cylinder of wood or other light material, revolving on the rod C as a center, about four inches in diameter at the bottom, and increasing upward to a width of six inches at the beam B, to which it approaches closely. The bottom of this cylinder or roller rests on the shoulder or elbow *b*, near the lower end of the rod C, and so that the lower edge of the roller is a little below the upper end of the shovel D, the latter approaching the curvature of the roller very closely, so as to prevent the intrusion of weeds, &c. For this purpose, also, the upper extremity of the roller is made to flare similarly to the outer side of the mouth of a vase in order to prevent weeds from intruding between the roller and the plow-beam. It may sometimes be necessary to lower the shovel, rod, and roller for deeper or shallower plowing, when a space is left between the roller and the plow-beam. The space thus left open must be filled by a block or other stopper to exclude weeds, &c., which might prevent the turning of the roller. A round block, *d*, represents this.

The operation of this device is as follows: The plow is defended in front from weeds, stalks, vines, &c., by the action of the shovel D, conjoined with that of the roller E, the latter not permitting rubbish to lodge against it, as a little preponderance of weight or tension on one side of the roller will cause it to revolve in that direction until the obstruction or rubbish is thrown off. The point of the shovel D is regulated by means of the rod C to a point a little below the surface of the soil, so as merely to remove rubbish to one side.

What I claim as my invention is—

A plow-fender, consisting of the rod C provided with the convex shovel D, roller E, and either with or without block *d*, when adjustable vertically by means of the eye or staple-bolts *a* and attached to the plow-beam forward of the plow, substantially as described.

In testimony that I claim the foregoing plow-fender I have hereunto set my hand this 7th day of August, 1871.

ALANSON P. WEBBER.

Witnesses:
HENRY W. WELLS,
JOHN E. JONES.